(12) United States Patent
Sloane

(10) Patent No.: US 11,558,183 B2
(45) Date of Patent: Jan. 17, 2023

(54) SYSTEM FOR EXCHANGING SYMMETRIC CRYPTOGRAPHIC KEYS USING COMPUTER NETWORK PORT KNOCKING

(71) Applicant: Bank of America Corporation, Charlotte, NC (US)

(72) Inventor: Brandon Sloane, Santa Barbara, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 208 days.

(21) Appl. No.: 16/875,151

(22) Filed: May 15, 2020

(65) Prior Publication Data
US 2021/0359844 A1 Nov. 18, 2021

(51) Int. Cl.
H04L 29/06 (2006.01)
H04L 9/08 (2006.01)
H04L 9/32 (2006.01)

(52) U.S. Cl.
CPC .......... *H04L 9/0819* (2013.01); *H04L 9/0869* (2013.01); *H04L 9/3239* (2013.01)

(58) Field of Classification Search
None
See application file for complete search history.

(56) References Cited

U.S. PATENT DOCUMENTS

| | | | | |
|---|---|---|---|---|
| 1,027,059 | A * | 5/1912 | Neher ....................... | G07F 9/10 312/35 |
| 6,260,073 | B1 * | 7/2001 | Walker .................. | H04L 49/351 370/911 |
| 8,180,902 | B1 * | 5/2012 | Day ....................... | H04L 67/565 709/227 |
| 8,250,631 | B2 * | 8/2012 | Iyengar ............... | H04L 63/1458 726/4 |
| 8,407,758 | B2 * | 3/2013 | Byres .................... | H04L 67/303 726/1 |

(Continued)

OTHER PUBLICATIONS

Maddock, Port Knocking: An Overview of Concepts, Issues and Implementations, 2004, SANS GIAC GSEC Practical on 23rd, Assignment version: 1.4c (Year: 2004).*

(Continued)

*Primary Examiner* — Eleni A Shiferaw
*Assistant Examiner* — Hassan A Hussein
(74) *Attorney, Agent, or Firm* — Moore & Van Allen PLLC; Seongun M. Hong

(57) ABSTRACT

A system is provided for exchanging symmetric cryptographic keys using computer network port knocking. The system may receive, from a networked computing device, a first series of packets on a first series of ports which may signify a request to open a secure network connection. Once the secure network connection has been opened, the system may receive a second series of packets on a second series of ports which may be used as seed values to generate a symmetric cryptographic key. Finally, the system may then receive a third series of packets on a third series of ports which may signify the end of the second series of packets (e.g., the seed values). In this way, the system may exchange symmetric key values with the networked computing device which may then be used to open secure communication channels between the system and the computing device.

20 Claims, 2 Drawing Sheets

(56) References Cited

U.S. PATENT DOCUMENTS

| | | | |
|---|---|---|---|
| 8,495,710 B2* | 7/2013 | Barnes | H04L 63/0263 726/4 |
| 8,838,570 B1* | 9/2014 | English | H04L 63/1408 707/709 |
| 8,856,924 B2* | 10/2014 | Holloway | H04L 63/1433 726/22 |
| 8,984,630 B2* | 3/2015 | Shulman | H04L 63/1416 726/25 |
| 9,043,868 B2 | 5/2015 | Byres et al. | |
| 9,294,502 B1* | 3/2016 | Benishti | H04L 63/145 |
| 9,300,683 B2* | 3/2016 | Rapaport | H04L 67/025 |
| 9,319,223 B2* | 4/2016 | Nix | H04W 80/04 |
| 9,391,962 B2* | 7/2016 | Houghton | H04L 63/0428 |
| 9,455,997 B2 | 9/2016 | Shulman et al. | |
| 9,473,530 B2* | 10/2016 | Bhogavilli | H04L 63/0236 |
| 9,544,329 B2* | 1/2017 | Call | H04L 63/145 |
| 9,661,020 B2 | 5/2017 | Holloway et al. | |
| 9,680,850 B2 | 6/2017 | Rapaport et al. | |
| 9,686,249 B2 | 6/2017 | Houghton et al. | |
| 9,742,799 B2 | 8/2017 | Bhogavilli et al. | |
| 9,825,928 B2* | 11/2017 | Lelcuk | H04L 63/08 |
| 10,050,938 B2* | 8/2018 | Moskow | H04L 63/0263 |
| 10,104,060 B2* | 10/2018 | Datta | H04L 63/0823 |
| 11,076,025 B1* | 7/2021 | Volpe | H04L 43/106 |
| 11,235,325 B2* | 2/2022 | Roberts | B01L 7/525 |
| 11,356,153 B2* | 6/2022 | Cao | H04L 5/0048 |
| 2011/0145910 A1* | 6/2011 | Barnes | H04L 63/0263 726/12 |
| 2013/0243005 A1* | 9/2013 | Miyazaki | H04L 49/253 370/401 |
| 2014/0143854 A1* | 5/2014 | Lopez | H04L 63/0218 726/14 |
| 2016/0234020 A1* | 8/2016 | Nix | H04L 9/0894 |
| 2016/0249210 A1* | 8/2016 | Chang | H04W 12/0431 |
| 2016/0381040 A1* | 12/2016 | Claes | H04L 63/123 726/22 |
| 2017/0019105 A1* | 1/2017 | Xiao | G06F 13/00 |
| 2017/0286710 A1* | 10/2017 | Cheung | H04L 63/083 |
| 2018/0097591 A1* | 4/2018 | Islam | H04L 5/0023 |
| 2019/0109713 A1* | 4/2019 | Clark | G06F 21/44 |
| 2019/0109821 A1* | 4/2019 | Clark | H04L 63/0414 |
| 2019/0363843 A1* | 11/2019 | Gordaychik | H04W 52/58 |
| 2020/0153625 A1* | 5/2020 | Schaap | H04L 9/0819 |
| 2020/0175179 A1* | 6/2020 | Iyer | G06F 21/602 |
| 2020/0322368 A1* | 10/2020 | Cohen | G06K 9/6218 |
| 2020/0366479 A1* | 11/2020 | Lee | H04L 9/0894 |
| 2021/0091943 A1* | 3/2021 | Hathorn | H04L 9/0894 |
| 2021/0152366 A1* | 5/2021 | Wang | H04L 9/0861 |
| 2021/0226936 A1* | 7/2021 | Nguyen | H04L 63/10 |
| 2021/0243026 A1* | 8/2021 | Mohassel | H04L 9/3236 |
| 2021/0351999 A1* | 11/2021 | Sloane | H04L 9/3247 |
| 2021/0377029 A1* | 12/2021 | Sloane | H04L 9/0643 |
| 2021/0377237 A1* | 12/2021 | Sloane | H04L 63/123 |
| 2021/0377238 A1* | 12/2021 | Sloane | H04W 12/0471 |
| 2021/0382998 A1* | 12/2021 | Chatterjee | G06F 16/2282 |
| 2022/0028302 A1* | 1/2022 | Takatsuka | H04L 9/0825 |
| 2022/0029903 A1* | 1/2022 | Jan | H04L 43/0858 |

OTHER PUBLICATIONS

R. D. Sharma and A. De, "A new secure model for quantum key distribution protocol," 2011 6th International Conference on Industrial and Information Systems, Kandy, 2011, pp. 462-466.

https://en.wikipedia.org/wiki/Port_knocking, retrieved from the Internet on Aug. 11, 2020; article last edited on Dec. 25, 2019.

* cited by examiner

SYSTEM FOR EXCHANGING SYMMETRIC CRYPTOGRAPHIC KEYS USING COMPUTER NETWORK PORT KNOCKING

FIELD OF THE INVENTION

The present disclosure embraces a system for exchanging symmetric cryptographic keys using computer network port knocking.

BACKGROUND

There is a need for a way to open secure communication channels over a network.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for exchanging symmetric cryptographic keys using computer network port knocking. In particular, the system may be configured to listen for incoming network packets on specific ports to generate seed values for a cryptographic key generation algorithm. In this regard, the system may receive, from a networked computing device, a first series of packets on a first series of ports which may signify a request to open a secure network connection. Once the secure network connection has been opened, the system may receive a second series of packets on a second series of ports which may be used as seed values to generate a symmetric cryptographic key. Finally, the system may then receive a third series of packets on a third series of ports which may signify the end of the second series of packets (e.g., the seed values). In this way, the system may exchange symmetric key values with the networked computing device which may then be used to open secure communication channels between the system and the computing device.

Accordingly, embodiments of the present disclosure provide a system for exchanging symmetric cryptographic keys using network port knocking. The system may comprise a memory device with computer-readable program code stored thereon; a communication device; and a processing device operatively coupled to the memory device and the communication device. The processing device may be configured to execute the computer-readable program code to receive, from a transmitting computing device, a first sequence of network packets on a first series of network ports; determine, from the first sequence of network packets, that the transmitting computing device is initiating a key exchange process; receive, from the transmitting computing device, a second sequence of network packets on a second series of network ports; receive, from the transmitting computing device, a third sequence of network packets on a third series of ports; determine, based on the third sequence of network packets, that the transmitting computing device is terminating the key exchange process; and generate a symmetric cryptographic key by inputting the second sequence of network packets as seed values into a key generation algorithm.

In some embodiments, the computer-readable program code further causes the processing device to initiate an error checking process for the symmetric cryptographic key, the error checking process comprising inputting the symmetric cryptographic key into a hash algorithm to generate a system key hash output; receiving a portion of a transmitting key hash output from the transmitting computing device; and comparing the portion of the transmitting key hash output with a portion of the system key hash output.

In some embodiments, comparing the portion of the transmitting key hash output with a portion of the system key hash output comprises detecting a match between the portion of the transmitting key hash output and the portion of the system key hash output; and based on detecting the match, determining that the symmetric cryptographic key has been successfully generated.

In some embodiments, comparing the portion of the transmitting key hash output with a portion of the system key hash output comprises detecting a mismatch between the portion of the transmitting key hash output and the portion of the system key hash output; and based on detecting the mismatch, automatically sending to the transmitting computing device a request to restart the key exchange process.

In some embodiments, the computer-readable program code further causes the processing device to automatically change at least one of a network packet type or network ports for initiating the key exchange process.

In some embodiments, the first sequence of network packets comprises Transmission Control Protocol ("TCP") synchronize ("SYN") packets.

In some embodiments, the third series of network ports are the first series of network ports.

Embodiments of the present disclosure also provide a computer program product for exchanging symmetric cryptographic keys using network port knocking. The computer program product may comprise at least one non-transitory computer readable medium having computer-readable program code portions embodied therein, the computer-readable program code portions comprising executable code portions for receiving, from a transmitting computing device, a first sequence of network packets on a first series of network ports; determining, from the first sequence of network packets, that the transmitting computing device is initiating a key exchange process; receiving, from the transmitting computing device, a second sequence of network packets on a second series of network ports; receiving, from the transmitting computing device, a third sequence of network packets on a third series of ports; determining, based on the third sequence of network packets, that the transmitting computing device is terminating the key exchange process; and generating a symmetric cryptographic key by inputting the second sequence of network packets as seed values into a key generation algorithm.

In some embodiments, the computer-readable code portions further comprise an executable code portion for initiating an error checking process for the symmetric cryptographic key, the error checking process comprising inputting the symmetric cryptographic key into a hash algorithm to generate a system key hash output; receiving a portion of a transmitting key hash output from the transmitting computing device; and comparing the portion of the transmitting key hash output with a portion of the system key hash output.

In some embodiments, comparing the portion of the transmitting key hash output with a portion of the system key hash output comprises detecting a match between the portion of the transmitting key hash output and the portion of the system key hash output; and based on detecting the match, determining that the symmetric cryptographic key has been successfully generated.

In some embodiments, comparing the portion of the transmitting key hash output with a portion of the system key hash output comprises detecting a mismatch between the portion of the transmitting key hash output and the portion of the system key hash output; and based on detecting the mismatch, automatically sending to the transmitting computing device a request to restart the key exchange process.

In some embodiments, the computer-readable code portions further comprise an executable code portion for automatically changing at least one of a network packet type or network ports for initiating the key exchange process.

In some embodiments, the first sequence of network packets comprises Transmission Control Protocol ("TCP") synchronize ("SYN") packets.

Embodiments of the present disclosure also provide a computer-implemented method for exchanging symmetric cryptographic keys using network port knocking, wherein the computer-implemented method comprises receiving, from a transmitting computing device, a first sequence of network packets on a first series of network ports; determining, from the first sequence of network packets, that the transmitting computing device is initiating a key exchange process; receiving, from the transmitting computing device, a second sequence of network packets on a second series of network ports; receiving, from the transmitting computing device, a third sequence of network packets on a third series of ports; determining, based on the third sequence of network packets, that the transmitting computing device is terminating the key exchange process; and generating a symmetric cryptographic key by inputting the second sequence of network packets as seed values into a key generation algorithm.

In some embodiments, the computer-implemented method further comprises initiating an error checking process for the symmetric cryptographic key, the error checking process comprising inputting the symmetric cryptographic key into a hash algorithm to generate a system key hash output; receiving a portion of a transmitting key hash output from the transmitting computing device; and comparing the portion of the transmitting key hash output with a portion of the system key hash output.

In some embodiments, comparing the portion of the transmitting key hash output with a portion of the system key hash output comprises detecting a match between the portion of the transmitting key hash output and the portion of the system key hash output; and based on detecting the match, determining that the symmetric cryptographic key has been successfully generated.

In some embodiments, comparing the portion of the transmitting key hash output with a portion of the system key hash output comprises detecting a mismatch between the portion of the transmitting key hash output and the portion of the system key hash output; and based on detecting the mismatch, automatically sending to the transmitting computing device a request to restart the key exchange process.

In some embodiments, the computer-implemented method further comprises automatically changing at least one of a network packet type or network ports for initiating the key exchange process.

In some embodiments, the first sequence of network packets comprises Transmission Control Protocol ("TCP") synchronize ("SYN") packets.

In some embodiments, the third series of network ports are the first series of network ports.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
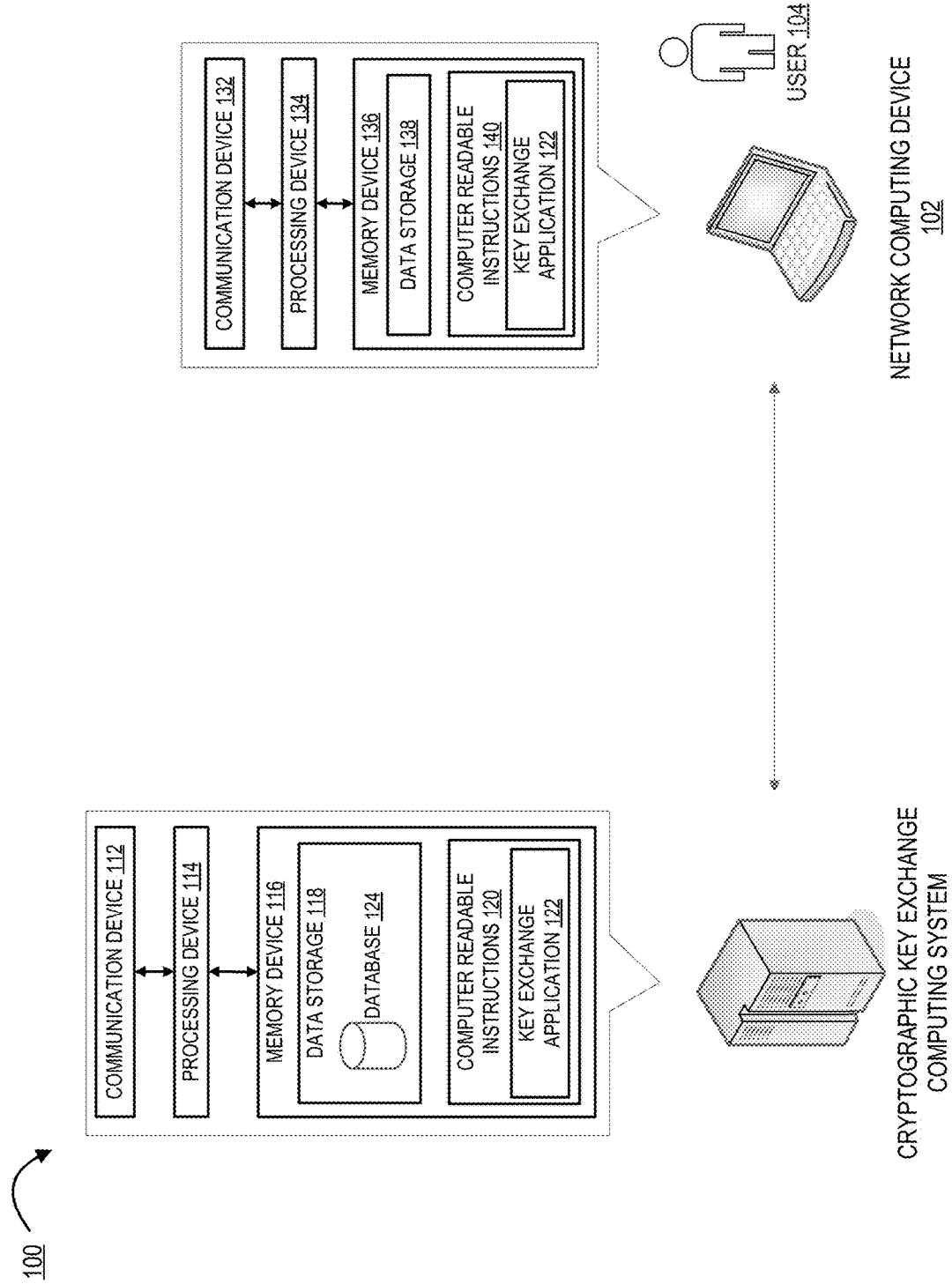
Figure 2:
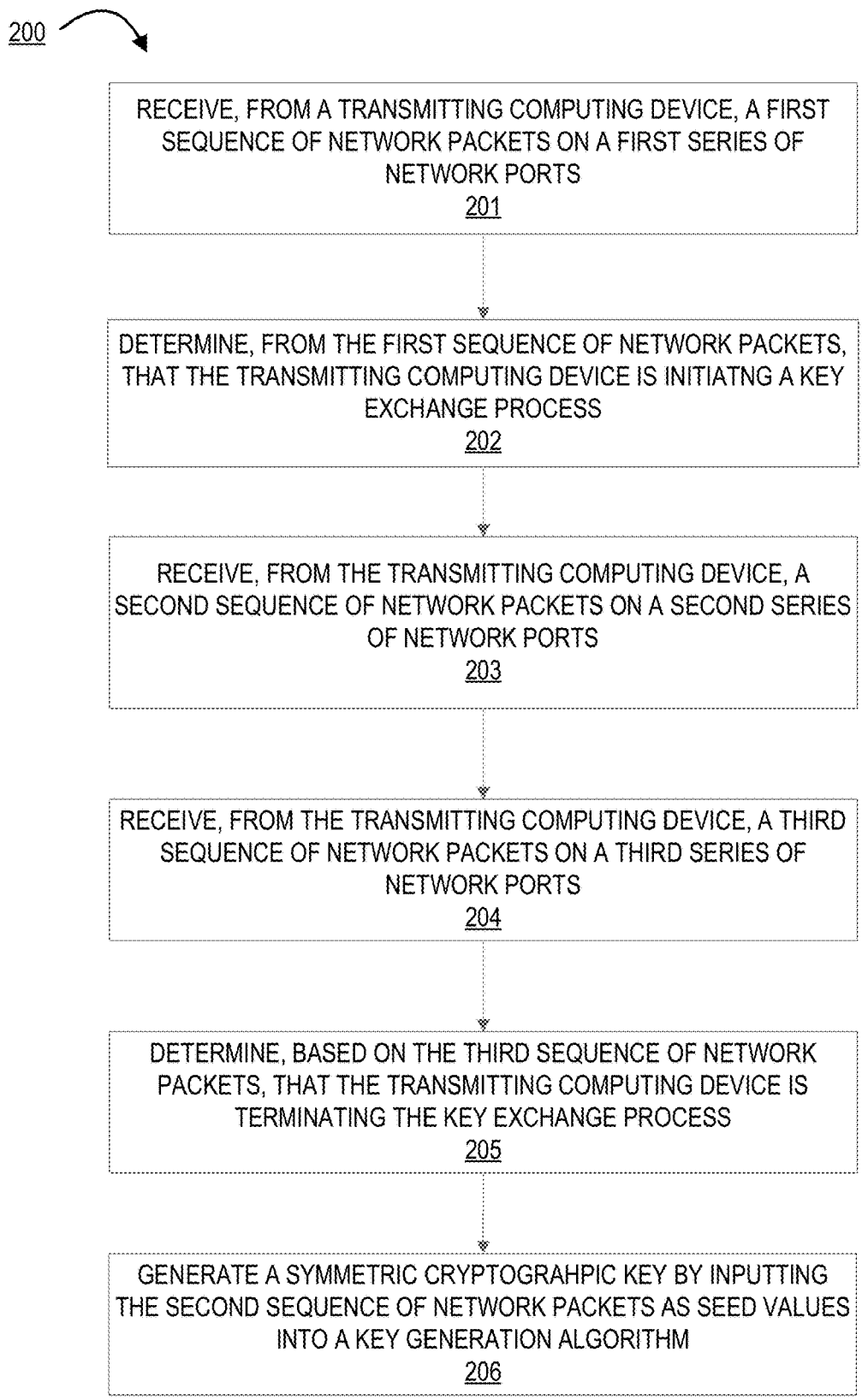

Having thus described embodiments of the invention in general terms, reference will now be made to the accompanying drawings, wherein:

FIG. 1 illustrates an operating environment for the cryptographic key exchange system, in accordance with one embodiment of the present disclosure; and FIG. 2 illustrates a process flow for exchanging symmetric cryptographic keys using network port knocking, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to physical and virtual objects and/or processes used to accomplish the entity's objectives. In this regard, "resource" may refer to applications, data files, computing systems and/or hardware, computing resources (e.g., processing power, memory space, or the like), computing functions, or the like.

"Cryptographic hash function" or "hash algorithm" as used herein may refer to a set of logical and/or mathematical operations or processes that may be executed on a specified segment of data to produce a hash output. Given a specified data input, the hash algorithm may produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

"Key" or "cryptographic key" as used herein may refer to data (e.g., a character string) which determines the manner in which an input is transformed into an output using a cryptographic algorithm (e.g., an encryption algorithm). Accordingly, "symmetric cryptography" or "symmetric key cryptography" may refer to a process for data encryption by which multiple users and/or devices use the same key to encrypt communications.

"Public-key cryptography" or "asymmetric cryptography" may refer to a process for data encryption and/or verification by which a pair of asymmetric corresponding cryptographic keys are generated (e.g., a "key pair" comprising a "public key" intended to be distributed and a "private key" intended to be possessed by a single user or device). Data encrypted using a public key may be decrypted only by the possessor of the corresponding private key. Furthermore, data signed with a private key may be validated by the possessor of the corresponding public key to verify the identity of the signer (which may be referred to herein as "digital signing").

"Port knocking" as used herein may refer to the sequential transmission of network packets (e.g., connection attempts) by a transmitting computing device to a series of network ports on a receiving computing device. Each pattern of transmissions may represent various stages or steps of securely exchanging data (e.g., cryptographic keys). For instance, the system may designate a pattern for initiating a key exchange, a pattern for seed values for key generation, and a pattern for terminating the key exchange.

Computing devices within a network may establish secure communication channels with one another for the purpose of exchanging data. To this end, it is desirable to securely exchange symmetric cryptographic keys to encrypt data being transferred across the communication channels. Accordingly, the system as described herein may use a port knocking mechanism through which computing devices may securely exchange symmetric keys by synchronizing seed values through patterns of network traffic. By using the same seed values as inputs a cryptographic key algorithm, the computing systems which share the key values may encrypt their communications.

For instance, the system may be configured to listen for network packets, such as synchronize ("SYN") packets to initiate a Transmission Control Protocol ("TCP") connection, across specific network ports. Subsequently, a receiving computing device (which may comprise a proxy server or firewall) may receive, from a transmitting computing device, a predetermined first sequence network packets sent to a first series of monitored network ports on the receiving computing device. If the system detects that the first sequence was sent from the same device (e.g., by reading the IP address/hardware ID of the transmitting computing device), the system may determine that the transmitting computing device is initiating a secure key exchange with the receiving computing device.

Once the secure key exchange has been initiated, the transmitting computing device may transmit a second sequence of network packets to a second series of network ports on the receiving computing device. The second sequence may represent the seed values for the key generation algorithm. Accordingly, both the receiving computing device and transmitting computing device may input the seed values (e.g., the second series of ports to which the network packets were transmitted) into the same cryptographic key generation algorithm to generate symmetric keys.

Finally, the transmitting computing device may transmit a third sequence of network packets to a third series of network ports on the receiving computing device. In some embodiments, the third series of network ports may be identical to the first series of network ports. The third sequence of packets may signify the end of the second sequence such that the receiving computing system may be able to identify where the second sequence ends and begins. The symmetric keys obtained from the seed data (e.g., the second sequence) may then be used to encrypt communications between the receiving computing device and transmitting computing device. In some embodiments, the system may automatically change the sequences for initiating and/or terminating the secure key exchange at periodic intervals. In this way, the system may mitigate the potential impacts that result from the key exchange mechanism being compromised by unauthorized parties.

An exemplary embodiment is provided for illustrative purposes. In one embodiment, the transmitting computing device may send a sequence of SYN packets to the receiving computing device at ports 22, 25, 21, 23, and then 22 again. This sequence of ports may serve as an indicator that the transmitting computing device is attempting to share seed values with the receiving computing device. The transmitting computing device may then send another sequence of SYN packets to the receiving computing device at ports 35, 37, 36, 37, then 32. This sequence may represent the seed values that will be used by the receiving computing device and the transmitting computing device as inputs into the key generation algorithm to generate the symmetric keys. Finally, the transmitting computing device may send a final sequence of SYN packets to 22, 25, 21, 23, and 22. The final sequence may signify the end of the seed values. Accordingly, both computing device may input 35, 37, 36, 37, and 32 into the same key generation algorithm to generate symmetric cryptographic keys to be used in establishing secure communication channels between the two computing devices.

The system as described herein confers a number of technological advantages over conventional secure communications systems. In particular, by masking seed values in ordinary network traffic, authorized computing devices are able to securely exchange cryptographic keys in a manner that is obfuscated to unauthorized parties. Furthermore, the packet sequences may be easily modified to further protect against the key exchange mechanism from being compromised.

Turning now to the figures, FIG. 1 illustrates an operating environment 100 for the cryptographic key exchange system, in accordance with one embodiment of the present disclosure. In particular, FIG. 1 illustrates a cryptographic key exchange computing system 101 that is operatively coupled, via a network, to a transmitting computing device 102. In such a configuration, the cryptographic key exchange computing system 101 may transmit information to and/or receive information from the transmitting computing device 102. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the transmitting computing device 102 is depicted as a single unit, the operating environment 100 may comprise multiple computing devices which may transmit or receive network packets to be used in the key generation/exchange process.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the cryptographic key exchange computing system 101 may be a networked server, desktop computer, laptop computer, routing device, or other type of computing system within the network environment which performs at least some of the key sharing processes as described elsewhere herein. For instance, the cryptographic key exchange computing system 101 may be a receiving computing device. In other embodiments, the cryptographic key exchange system 101 may designate packet/port sequences to be used in the key exchange process.

Accordingly, the cryptographic key exchange computing system 101 may comprise a processing device 114 operatively coupled to a communication device 112 and a memory device 116 having data storage 118 and computer readable instructions 120 stored thereon. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 is operatively coupled to the communication device 112 and the memory device 116. The processing device 114 uses the communication device 112 to communicate with the network and other devices on the network, such as, but not limited to the transmitting computing device 102. The communication device 112 generally comprises a modem, antennae, WiFi or Ethernet adapter, radio transceiver, or other device for communicating with other devices on the network.

The memory device 116 may have computer-readable instructions 120 stored thereon, which in one embodiment includes the computer-readable instructions 120 of a key exchange application 122, which may comprise computer-executable program code which may instruct the processing device 114 to perform certain logic, data processing, and data storing functions of the application to accomplish the entity's objectives. For instance, the key exchange application 122 may perform the port monitoring and/or packet transmitting functions as described herein as well as change the parameters of the key exchange process such as changing time to live ("TTL") windows, changing packet types (e.g., from TCP to UDP packets), changing port designations and/or sequences, and the like.

In some embodiments, the memory device 116 includes data storage 118 for storing data related to the system environment. In this regard, the data storage 118 may comprise a database 124, which may include data and/or metadata regarding the key generation process, such as symmetric keys generated, key exchange parameters, or the like. It should be understood that in alternative embodiments, the database 124 may be hosted on a separate computing system (e.g., a database server) instead of being hosted on the cryptographic key exchange computing system 101.

As further illustrated in FIG. 1, the operating environment 100 may further comprise a transmitting computing device 102 in operative communication with the cryptographic key exchange computing system 101. In some embodiments, the transmitting computing device 102 may be a computing system that is operated by a user 104, such as an administrator, agent, or employee of the entity. Accordingly, the transmitting computing device 102 may be a device such as a desktop computer, laptop, IoT device, smartphone, tablet, single-board computer, or the like. The transmitting computing device 102 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The transmitting computing device 102 may comprise a processing device 134 operatively coupled to a communication device 132 and a memory device 136 having data storage 138 and computer readable instructions 140 stored thereon, where the computer readable instructions 140 may include the key exchange application 122. The key exchange application 122 may cause the processing device 134 to transmit packets to the cryptographic key exchange computing system 101 in accordance with the parameters set by the system.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for exchanging symmetric cryptographic keys using network port knocking, in accordance with some embodiments. The process begins at block 201, where the system receives, from a transmitting computing device, a first sequence of network packets on a first series of network ports. In this regard, the system may listen for the network packets on a predetermined set of ports. The network packets may be, for instance, TCP SYN packets, though it is within the scope of the disclosure for the network packets to include other types of packets (e.g., UDP packets). The first series of ports may include transmissions sent to the same port within the first series. For example, a sequence of SYN packets may be sent to ports 22, 25, 24, 27, and 22 in succession.

The process continues to block 202, where the system determines, from the first sequence of network packets, that the transmitting computing device is initiating a key exchange process. Continuing the above example, the system may determine that the transmission of SYN packets to 22, 25, 24, 27, then 22 again (e.g., the first sequence of network packets) indicates that the transmitting computing device is attempting to open a secure communication channel. Accordingly, once the system has detected the first sequence of network packets from the same device (e.g., from the same IP address), the system may continue to listen for additional packets from the same device in anticipation of receiving the seed values to generate the symmetric key. In some embodiments, the system may, on a periodic basis, automatically change the type of network packet (e.g., TCP to UDP) or the sequence of ports needed to initiate the key exchange process.

The process continues to block 203, where the system receives, from the transmitting computing device, a second sequence of network packets on a second series of network ports. Continuing the above example, the transmitting computing device may transmit SYN packets sequentially to ports 35, 37, 39, 38, then 32. This second series of ports may be used by the system and the transmitting computing device as seed values for a key generation algorithm. That said, the system may need a way to determine when the second sequence begins and ends.

In this regard, the process continues to block 204, where the system receives, from the transmitting computing device, a third sequence of network packets on a third series of network ports. The third sequence may indicate the end of the second sequence such that the second sequence may be recognized by the system as the seed values to be used in the key generation algorithm. Accordingly, in some embodiments, the third series of ports may be the same as the first series of ports. Continuing the above example, a third series of SYN packets may again be sent to 22, 25, 24, 27, then 22 again. This sequence may allow the system to exactly determine which port values should be used for the key generation process.

The process continues to block 205, where the system determines, based on the third sequence of network packets, that the transmitting computing device is terminating the key exchange process. Once the third sequence of network packets has been received from the same transmitting device, the system may begin the key generation process, as will be described below.

The process concludes at block 206, where the system generates a symmetric cryptographic key by inputting the second sequence of network packets as seed values into a key generation algorithm. By using the same seed values with the key generation algorithm, the system and the transmitting computing device may compute the same cryptographic key, which may then be used to encrypt communications to open a secure communication channel. In this way, the system may prevent compromise of the secure channel and/or the cryptographic key used in communications across the secure channel.

In some embodiments, the system may perform error checking of the symmetric key in order to ensure that the system and transmitting device have generated the same cryptographic key. For instance, poor network conditions may affect the signals being transmitted and/or received over the network, which may in turn cause the system to incorrectly detect which packets are being sent and/or which ports are being contacted. In such embodiments, the system may further input the symmetric key into a hash algorithm (e.g., SHA-1) to generate a system key hash output. The transmitting device may also input its symmetric key into the same hash algorithm to generate a transmitting key hash output, then transmit at least a portion (e.g., the last four digits) of the transmitting key hash output to the system. The system may then compare the portion of the system key hash output with the portion of the transmitting key hash output. If the values match, the system may determine that the symmetric key has been successfully generated. On the other hand, if there is a mismatch in hash values, the system may automatically send a request to the transmitting computing device to repeat the key generation process.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for exchanging symmetric cryptographic keys using network port knocking, the system comprising:
   a memory device with computer-readable program code stored thereon;
   a communication device; and a processor operatively coupled to the memory device and the communication device, wherein processor is configured to execute the computer-readable program code to:
- receive, from a transmitting computing device, a first sequence of network packets on a first series of network ports, wherein the first sequence of network packets on the first series of ports represents a pattern for initiating a key exchange process;
- determine, from the first sequence of network packets, that the transmitting computing device is initiating the key exchange process, wherein the key exchange process generates a symmetric cryptographic key for use in secure networked communications;
- receive, from the transmitting computing device, a second sequence of network packets on a second series of network ports;
- receive, from the transmitting computing device, a third sequence of network packets on a third series of ports, wherein the third sequence of network packets on the third series of ports represents a pattern for terminating the key exchange process;
- determine, based on the third sequence of network packets, that the transmitting computing device is terminating the key exchange process;
- based on determining that the transmitting computing device is terminating the key exchange process, determine that the second series of ports are seed values for key generation;
- generate the symmetric cryptographic key by inputting the seed values into a key generation algorithm; and
- automatically change, at a predetermined interval, at least one of the pattern for initiating the key exchange process or the pattern for terminating the key exchange process.

2. The system according to claim 1, wherein the computer-readable program code further causes the processor to initiate an error checking process for the symmetric cryptographic key, the error checking process comprising:
- inputting the symmetric cryptographic key into a hash algorithm to generate a system key hash output;
- receiving a portion of a transmitting key hash output from the transmitting computing device; and
- comparing the portion of the transmitting key hash output with a portion of the system key hash output.

3. The system according to claim 2, wherein the comparing of the portion of the transmitting key hash output with a portion of the system key hash output comprises:
- detecting a match between the portion of the transmitting key hash output and the portion of the system key hash output; and
- based on detecting the match, determining that the symmetric cryptographic key has been successfully generated.

4. The system according to claim 2, wherein the comparing of the portion of the transmitting key hash output with a portion of the system key hash output comprises:
- detecting a mismatch between the portion of the transmitting key hash output and the portion of the system key hash output; and
- based on detecting the mismatch, automatically sending to the transmitting computing device a request to restart the key exchange process.

5. The system according to claim 1, wherein the computer-readable program code further causes the processor to automatically change at least one of a network packet type or network ports for initiating the key exchange process.

6. The system according to claim 1, wherein the first sequence of network packets comprises Transmission Control Protocol ("TCP") synchronize ("SYN") packets.

7. The system according to claim 1, wherein the third series of network ports are the first series of network ports.

8. A computer program product for exchanging symmetric cryptographic keys using network port knocking, the computer program product comprising at least one non-transitory computer readable medium having computer-readable program code portions embodied therein, the computer-readable program code portions comprising executable code portions for:
- receiving, from a transmitting computing device, a first sequence of network packets on a first series of network ports, wherein the first sequence of network packets on the first series of ports represents a pattern for initiating a key exchange process;
- determining, from the first sequence of network packets, that the transmitting computing device is initiating the key exchange process, wherein the key exchange process generates a symmetric cryptographic key for use in secure networked communications;
- receiving, from the transmitting computing device, a second sequence of network packets on a second series of network ports;
- receiving, from the transmitting computing device, a third sequence of network packets on a third series of ports, wherein the third sequence of network packets on the third series of ports represents a pattern for terminating the key exchange process;
- determining, based on the third sequence of network packets, that the transmitting computing device is terminating the key exchange process;
- based on determining that the transmitting computing device is terminating the key exchange process, determining that the second series of ports are seed values for key generation;
- generating the symmetric cryptographic key by inputting seed values into a key generation algorithm; and
- automatically changing, at a predetermined interval, at least one of the pattern for initiating the key exchange process or the pattern for terminating the key exchange process.

9. The computer program product according to claim 8, wherein the computer-readable code portions further comprise an executable code portion for initiating an error checking process for the symmetric cryptographic key, the error checking process comprising:
- inputting the symmetric cryptographic key into a hash algorithm to generate a system key hash output;
- receiving a portion of a transmitting key hash output from the transmitting computing device; and
- comparing the portion of the transmitting key hash output with a portion of the system key hash output.

10. The computer program product according to claim 9, wherein the comparing of the portion of the transmitting key hash output with a portion of the system key hash output comprises:
- detecting a match between the portion of the transmitting key hash output and the portion of the system key hash output; and
- based on detecting the match, determining that the symmetric cryptographic key has been successfully generated.

11. The computer program product according to claim 9, wherein the comparing of the portion of the transmitting key hash output with a portion of the system key hash output comprises:

detecting a mismatch between the portion of the transmitting key hash output and the portion of the system key hash output; and based on detecting the mismatch, automatically sending to the transmitting computing device a request to restart the key exchange process.

12. The computer program product according to claim 8, wherein the computer-readable code portions further comprise an executable code portion for automatically changing at least one of a network packet type or network ports for initiating the key exchange process.

13. The computer program product according to claim 8, wherein the first sequence of network packets comprises Transmission Control Protocol ("TCP") synchronize ("SYN") packets.

14. A computer-implemented method for exchanging symmetric cryptographic keys using network port knocking, wherein the computer-implemented method comprises:

receiving, from a transmitting computing device, a first sequence of network packets on a first series of network ports, wherein the first sequence of network packets on the first series of ports represents a pattern for initiating a key exchange process;

determining, from the first sequence of network packets, that the transmitting computing device is initiating the key exchange process, wherein the key exchange process generates a symmetric cryptographic key for use in secure networked communications;

receiving, from the transmitting computing device, a second sequence of network packets on a second series of network ports;

receiving, from the transmitting computing device, a third sequence of network packets on a third series of ports, wherein the third sequence of network packets on the third series of ports represents a pattern for terminating the key exchange process;

determining, based on the third sequence of network packets, that the transmitting computing device is terminating the key exchange process;

based on determining that the transmitting computing device is terminating the key exchange process, determining that the second series of ports are seed values for key generation;

generating the symmetric cryptographic key by inputting the seed values into a key generation algorithm; and automatically changing, at a predetermined interval, at least one of the pattern for initiating the key exchange process or the pattern for terminating the key exchange process.

15. The computer-implemented method according to claim 14, wherein the computer-implemented method further comprises initiating an error checking process for the symmetric cryptographic key, the error checking process comprising:

inputting the symmetric cryptographic key into a hash algorithm to generate a system key hash output;

receiving a portion of a transmitting key hash output from the transmitting computing device; and comparing the portion of the transmitting key hash output with a portion of the system key hash output.

16. The computer-implemented method according to claim 15, wherein the comparing of the portion of the transmitting key hash output with a portion of the system key hash output comprises:

detecting a match between the portion of the transmitting key hash output and the portion of the system key hash output; and based on detecting the match, determining that the symmetric cryptographic key has been successfully generated.

17. The computer-implemented method according to claim 15, wherein the comparing of the portion of the transmitting key hash output with a portion of the system key hash output comprises:

detecting a mismatch between the portion of the transmitting key hash output and the portion of the system key hash output; and based on detecting the mismatch, automatically sending to the transmitting computing device a request to restart the key exchange process.

18. The computer-implemented method according to claim 14, wherein the computer-implemented method further comprises automatically changing at least one of a network packet type or network ports for initiating the key exchange process.

19. The computer-implemented method according to claim 14, wherein the first sequence of network packets comprises Transmission Control Protocol ("TCP") synchronize ("SYN") packets.

20. The computer-implemented method according to claim 14, wherein the third series of network ports are the first series of network ports.

\* \* \* \* \*